(No Model.) 2 Sheets—Sheet 1.

F. A. ODIN.
VEGETABLE COOKING AND CANNING MACHINE.

No. 528,680. Patented Nov. 6, 1894.

WITNESSES:
C. E. Tomlinson
J. J. Laass

INVENTOR:
Frank A. Odin
By E. Laass
his ATTORNEY.

(No Model.) 2 Sheets—Sheet 2.

F. A. ODIN.
VEGETABLE COOKING AND CANNING MACHINE.

No. 528,680. Patented Nov. 6, 1894.

WITNESSES:
C. E. Tomlinson
J. J. Saass

INVENTOR:
Frank A. Odin
By E. Laass
his ATTORNEY.

UNITED STATES PATENT OFFICE.

FRANK A. ODIN, OF SYRACUSE, NEW YORK.

VEGETABLE COOKING AND CANNING MACHINE.

SPECIFICATION forming part of Letters Patent No. 528,680, dated November 6, 1894.

Application filed April 5, 1894. Serial No. 506,376. (No model.)

*To all whom it may concern:*

Be it known that I, FRANK A. ODIN, of Syracuse, in the county of Onondaga, in the State of New York, have invented new and useful Improvements in Vegetable Cooking and Canning Machines, of which the following, taken in connection with the accompanying drawings, is a full, clear, and exact description.

This invention consists in an improved organization of an apparatus designed to cook the vegetables more evenly and effectually and without liability of overcharging the same with steam. The successive charges of the cooked substance entering the can-filler are thereby rendered of a uniform density and the cans are filled more evenly.

The invention is fully illustrated in the annexed drawings, in which—

Figure 1:
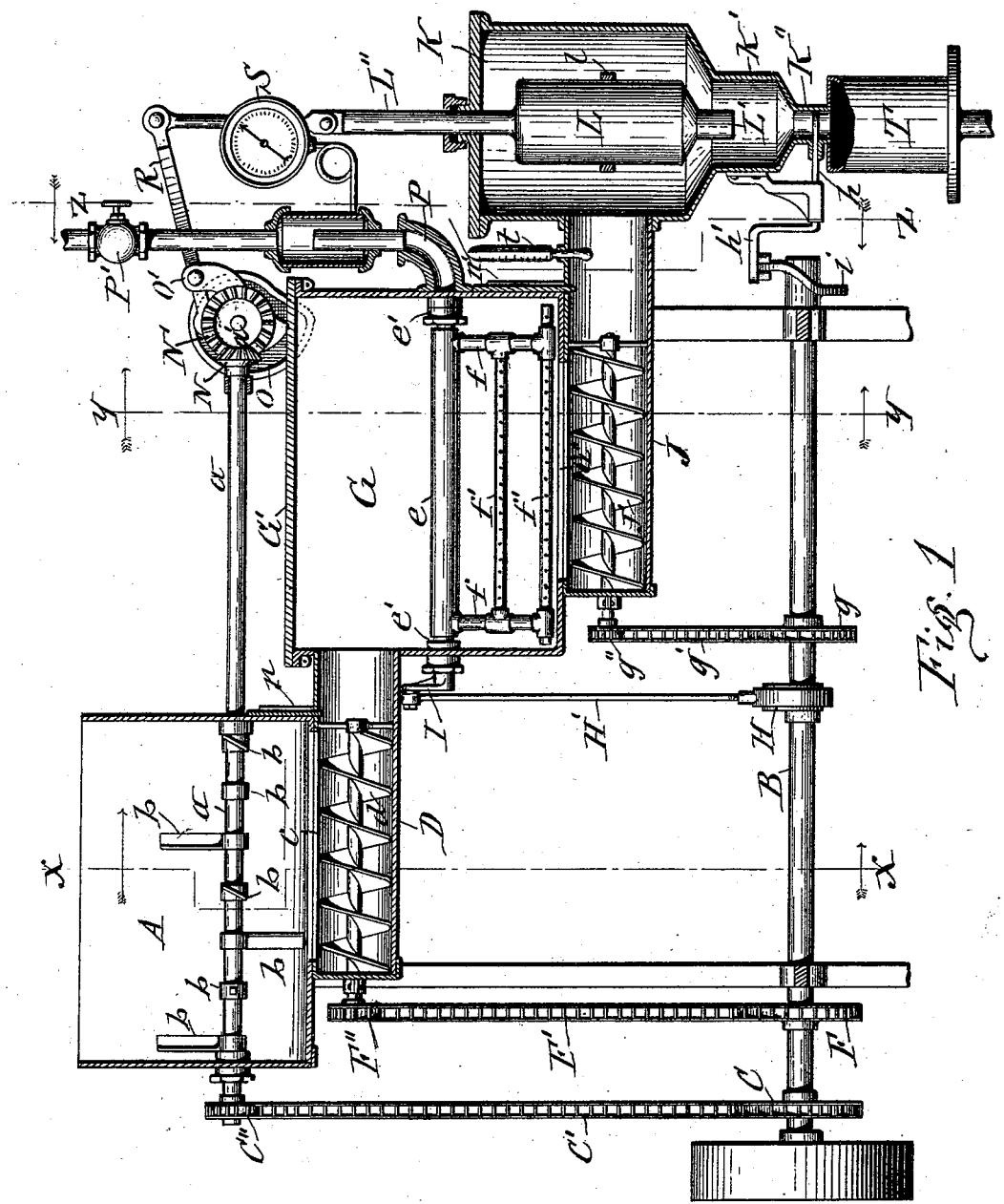
Figure 4:
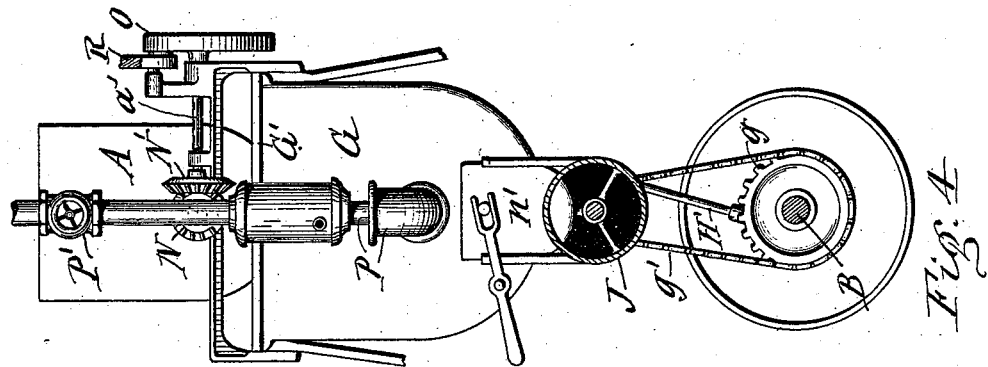
Figure 3:
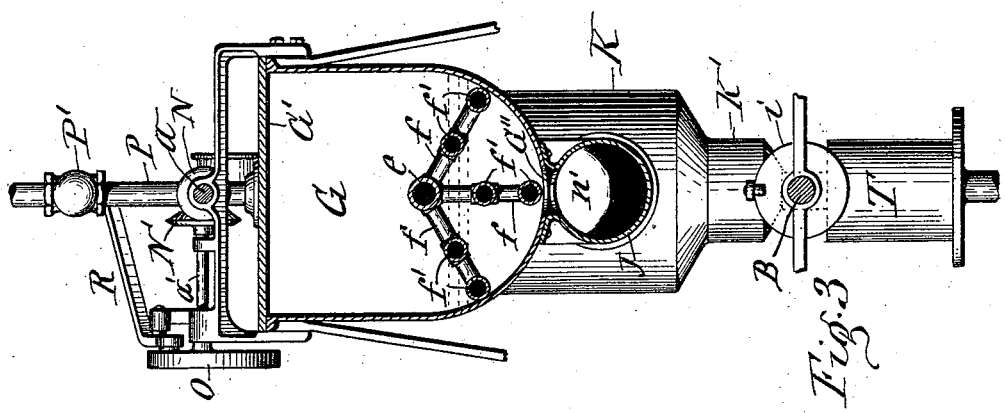
Figure 2:
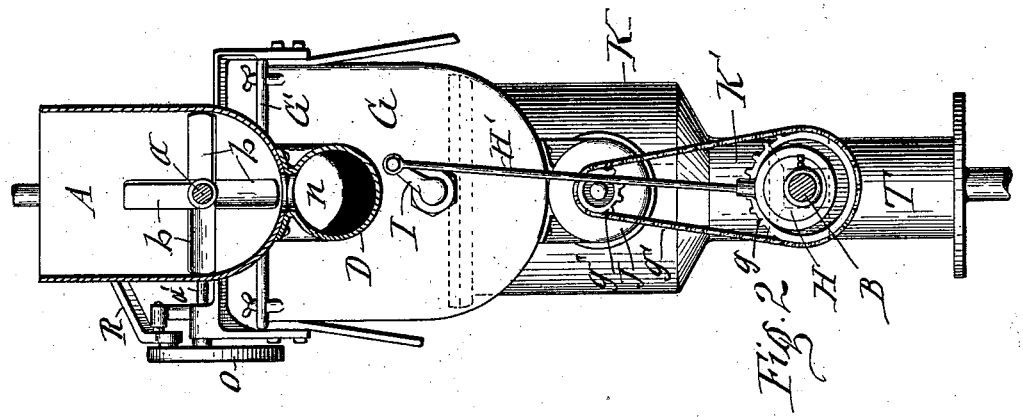

Figure 1 is a vertical longitudinal section through the center of the cooking and canning apparatus, and Figs. 2, 3 and 4 are vertical transverse sections on lines —X—X—, —Y—Y— and —Z—Z— in Fig. 1 viewed in the directions indicated by the arrows.

Similar letters of reference indicate corresponding parts.

—A— represents the hopper for the reception of the vegetables to be cooked and canned. Said hopper I form with a semi-cylindrical bottom which is concentric with a rotary shaft —a— extending longitudinally through the hopper and equipped with paddles —b— b— by means of which the contents of the hopper are effectually stirred to mix the liquid with the solid portions of the vegetables.

—B— denotes the main driving shaft to which is attached a sprocket-wheel —C— which by a sprocket-chain —C'— is connected with a sprocket-wheel —C''— secured to the end of the agitator shaft —a— which shaft thus receives rotary motion.

To the under side of the hopper —A— and parallel therewith is secured the cylinder —D— the top of which is provided with an opening —c— extending lengthwise thereof and directly over this opening the bottom of the hopper is provided with a corresponding opening to permit the cylinder —D— to communicate with the interior of the hopper.

In the cylinder —D— is a spiral conveyer —d— which is rotated by a sprocket-wheel —F— on the driving shaft —B— connected by a sprocket-chain —F'— with a sprocket-wheel —F''— fastened to the end of the conveyer shaft as illustrated in Fig. 1 of the drawings.

To the delivery end of the cylinder —D— is connected the cooking chamber —G— which I prefer to form of the shape of a deep horizontal trough having a semi-cylindrical bottom and provided with a removable steam-tight cover —G'— to afford ready access to the interior of said cooking chamber for cleaning or repairing the same when required. Concentric with the semi-cylindrical bottom of said cooking chamber is a hollow horizontal shaft —e— journaled in tubular bearings —e'—e'— on the ends of the chamber. One end of said shaft is closed while the opposite end communicates with a steam-pipe —P— which is provided with a stop-cock or valve —P'— by which to control the flow of steam to be admitted into the shaft —e— for cooking the vegetables in the chamber —G—. From said shaft extend radially, hollow arms —f—f— arranged in pairs or sets each of which has connected to it, tubes —f'—f'— extending lengthwise of the chamber —G— and communicating with the interior of the shaft through the aforesaid arms, whereby said tubes are charged with steam. The tubes are perforated at intervals of their lengths to allow the steam to escape therefrom. The shaft —e— receives a rocking motion by means of an eccentric —H— on the driving shaft —B—, the eccentric-rod —H'— of which is connected to a crank —I— attached to the protruding closed end of the shaft —e—.

The bottom of the cooking chamber —G— is provided with a longitudinal opening —G''— and to said bottom is connected a cylinder —J— in which is a rotary spiral conveyer —J'— driven by a sprocket-wheel —g— on the driving shaft —B— connected by a sprocket-chain —g'— with a sprocket-wheel —g''— attached to the conveyer-shaft. The top of said cylinder is provided with an opening coinciding with the opening —G''— and thus allowing the cooked material to enter said cylinder.

—K— denotes the case of the can-filler which is connected to the delivery end of the conveyer cylinder —J— to receive the cooked material thereof. The lower portion of this case is formed with a circumferentially reduced cylinder —K'— which terminates with a still further circumferentially reduced discharge-nozzle —K"— on its lower end. Across said nozzle slides a gate —h— which is operated by means of an arm —h'— extending from the gate and held in contact with a cam —i— attached to the driving shaft —B—.

The inner surfaces of the hopper —A—, cooking chamber —G—, filler-case —K,— K'—K"— and conveyer cylinders —D— and —J— are either enameled, or agatized or lined with other suitable non-corrosive material to prevent staining of the vegetables under treatment and guard against clogging of the apparatus.

In the filler-case —K— is a plunger —L— which is considerably smaller in diameter and shorter than the interior of said case to allow the cooked material to freely enter the case and afford the requisite vertical movement of the plunger. The lower end of the plunger terminates with a supplemental plunger —L'— which is nearly or quite of the same diameter as the interior of the nozzle —K"— while the interior of the cylindrical portion —K'— immediately above said nozzle is of the same or nearly the same diameter as the plunger —L—. —l— represents a guide for the said plunger. The plunger is actuated by suitable mechanism deriving motion from the driving shaft —B—. For exemplification of said mechanism, I have shown it of the form of a beveled pinion —N— attached to the extension of the shaft —a— meshing with a beveled gear —N'— attached to a counter-shaft —a'— to which is also secured a cam —O—. A lever —R— is pivoted intermediate its length to a bracket —O'— or other suitable support and connected at one end to the plunger-rod —L"— and has its opposite end in operative contact with the cam —O— by which it receives an intermittent oscillatory motion.

—n— and —n'— represent gates arranged movably across the discharge ends of the conveyer-cylinders —D— and —J— to control the flow of the material under treatment.

S— represents a steam-gage connected to the steam-pipe —P—. —t— denotes a thermometer connected to the cylinder of the conveyer —J'— which forces the cooked material to the filler-chamber —K— which thermometer is employed for ascertaining the temperature of the material entering the filler-case, and —T— represents one of the cans to be filled.

I do not limit myself specifically to the several described mechanisms for operating the stirring or agitating devices in the hopper —A— and cooking chamber —G— and for revolving the conveyers —d— and —J'— and actuating the plunger —L,— as various well known mechanical contrivances may be employed for that purpose.

The operation of my invention is as follows: The vegetables to be cooked are deposited into the hopper —A—. The revolving shaft —a— causes the paddles —b—b—b— to effectually stir said vegetables so as to thoroughly mix the liquid with the solid portions thereof and thus render the vegetable mass of a uniform density and distribute the same over the discharge opening —c— through which they pass to the conveyer —d— by means of which the vegetables are forced into the cooking chamber —G— where the cooking is effected by the steam-heated pipes —e—, —f— and —f'— and by the steam emitted from the latter pipes which steam is caused to penetrate the mass and become thoroughly distributed throughout the same by the agitation of said mass produced by the oscillation of said pipes. Hence during the process of cooking the material, the same is maintained of a uniform density and in this condition it is conveyed to the filler-case —K— by the conveyer —J'— which is separate and operated independent of the agitator in the cooking chamber. The cooked mass of uniform density is forced at regular intervals from the filler-case —K— to the can —T— to be filled by the descending plunger —L—, the can being placed under the nozzle —K"— while the gate —h— is closed and before the plunger enters the cylindrical bottom portion —K'— of the filler-case.

The cylindrical lower portion —K'— of the filler-case down to the gate —h— is of a capacity to contain the requisite quantity of vegetables to fill the can.

What I claim as my invention is—

1. The combination of a cooking-chamber formed with a horizontal semi-cylindrical bottom and with a discharge opening in said bottom, a tubular agitator disposed with its axis horizontally and concentric to the bottom of the cooking-chamber, a steam-induction pipe communicating with said agitator, a cylinder under the bottom of said chamber parallel therewith and communicating with the discharge opening thereof, a spiral conveyer in said cylinder, and a can-filler connected to said cylinder.

2. In combination with the can filler, a cooking chamber, a tubular rock-shaft extending horizontally through said chamber, tubular arms extending from said rock-shaft, tubes connecting said arms, a steam-pipe communicating with the interior of said rock-shaft, a conveyer under the cooking chamber carrying the cooked material to the filler, a horizontally elongated hopper, a rotary shaft extending longitudinally through said hopper, paddles attached to said shaft, and a conveyer under the hopper leading therefrom to the cooking chamber as set forth.

3. The improved filler consisting of a cylindrical case formed with a circumferentially reduced cylindrical bottom portion terminated with a further reduced discharge nozzle, a gate sliding across said nozzle, and a plunger of nearly or quite the same diameter as the interior of the reduced bottom portion of the case and entering the same and terminated with a further reduced supplemental plunger entering the nozzle substantially as described and shown.

In testimony whereof I have hereunto signed my name this 28th day of March, 1894.

FRANK A. ODIN. [L. S.]

Witnesses:
C. L. BENDIXON,
J. J. LAASS.